United States Patent
Ingenbleek et al.

(10) Patent No.: US 8,244,440 B2
(45) Date of Patent: Aug. 14, 2012

(54) METHOD AND DEVICE FOR TRIGGERING A CIRCUIT ARRANGEMENT WITH ELECTRIC ACTUATORS

(75) Inventors: Robert Ingenbleek, Kressbronn (DE); Markus Ulbricht, Tettnang (DE); Mario Steinborn, Friedrichshafen (DE); Armin Brentel, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 993 days.

(21) Appl. No.: 12/282,373

(22) PCT Filed: Feb. 21, 2007

(86) PCT No.: PCT/EP2007/051677
§ 371 (c)(1),
(2), (4) Date: Sep. 25, 2008

(87) PCT Pub. No.: WO2007/104630
PCT Pub. Date: Sep. 20, 2007

(65) Prior Publication Data
US 2009/0093935 A1    Apr. 9, 2009

(30) Foreign Application Priority Data
Mar. 15, 2006   (DE) .................... 10 2006 011 805

(51) Int. Cl.
*B60R 16/02* (2006.01)
*G06F 17/00* (2006.01)

(52) U.S. Cl. ............. 701/51; 701/58; 74/335; 477/115; 477/107; 477/109

(58) Field of Classification Search .................... 701/51, 701/58; 74/335; 477/115, 107, 3, 101, 109
See application file for complete search history.

(56) References Cited

U.S. PATENT DOCUMENTS

| | | | | |
|---|---|---|---|---|
| 4,724,502 A | * | 2/1988 | Kawahira et al. | 361/62 |
| 5,370,320 A | * | 12/1994 | Sofer | 239/585.1 |
| 5,465,757 A | * | 11/1995 | Peters | 137/625.65 |
| 5,730,509 A | * | 3/1998 | Eith et al. | 303/119.2 |
| 5,742,467 A | * | 4/1998 | Schmitz | 361/154 |
| 5,749,349 A | * | 5/1998 | Detweiler et al. | 123/520 |
| 5,749,350 A | * | 5/1998 | Bender | 123/568.24 |
| 5,810,330 A | * | 9/1998 | Eith et al. | 251/129.19 |
| 5,829,335 A | * | 11/1998 | Ewald et al. | 91/363 A |
| 5,832,777 A | * | 11/1998 | Weilant | 74/335 |
| 5,992,590 A | * | 11/1999 | Harries | 192/3.58 |

(Continued)

FOREIGN PATENT DOCUMENTS

DE    195 36 697 A1    4/1997

(Continued)

*Primary Examiner* — Thomas Black
*Assistant Examiner* — Wae Louie
(74) *Attorney, Agent, or Firm* — Davis & Bujold, P.L.L.C.

(57) ABSTRACT

A method and device for actuating a shifting arrangement with electric actuators of a transmission control of a motor vehicle. The method includes determining a total current of the shifting arrangement available at a point in time, detecting shift requests of shift elements and compared these with the total available current. Shift requests are then tested according to preset priorities and the sequentially performed according to the priority test. The method avoids exceeding a preset allowed current load, when the requested shifts would exceed the total available current. If the total available current would not be exceeded by the requested shifts, the requests are carried out. A device is also provided in the shifting arrangement which has control and detection mechanisms that monitor current and control the current flow.

19 Claims, 2 Drawing Sheets

U.S. PATENT DOCUMENTS

| | | | |
|---|---|---|---|
| 5,993,354 A * | 11/1999 | Winks | 477/107 |
| 6,209,408 B1 * | 4/2001 | DeJonge et al. | 74/335 |
| 6,301,528 B1 * | 10/2001 | Bertram et al. | 701/1 |
| 6,504,699 B1 * | 1/2003 | Rader et al. | 361/155 |
| 6,532,980 B1 * | 3/2003 | Langeveld | 137/2 |
| 6,591,704 B2 * | 7/2003 | Kamiya et al. | 74/335 |
| 6,592,493 B2 * | 7/2003 | Loeffler et al. | 477/115 |
| 6,607,176 B1 * | 8/2003 | Mayr et al. | 251/129.08 |
| 6,619,615 B1 | 9/2003 | Mayr et al. | |
| 6,657,846 B1 * | 12/2003 | Philipp et al. | 361/160 |
| 6,694,803 B2 * | 2/2004 | Klik et al. | 73/37 |
| 6,705,175 B1 * | 3/2004 | Klatt | 74/335 |
| 6,815,625 B1 * | 11/2004 | Leopold et al. | 200/296 |
| 6,891,710 B2 * | 5/2005 | Mayr et al. | 361/147 |
| 6,897,710 B2 * | 5/2005 | Pasotti et al. | 327/536 |
| 7,011,379 B2 * | 3/2006 | Rader et al. | 303/119.2 |
| 7,021,603 B2 * | 4/2006 | Wygnaski | 251/129.15 |
| 7,252,619 B2 * | 8/2007 | Tabata et al. | 477/3 |
| 7,430,936 B2 * | 10/2008 | Petzold et al. | 74/339 |
| 7,878,084 B2 * | 2/2011 | Petzold et al. | 74/335 |
| 2003/0173825 A1 * | 9/2003 | Rader et al. | 303/119.2 |
| 2008/0197698 A1 * | 8/2008 | Gehring et al. | 307/9.1 |
| 2009/0093935 A1 * | 4/2009 | Ingenbleek et al. | 701/51 |

FOREIGN PATENT DOCUMENTS

| | | |
|---|---|---|
| DE | 198 57 916 A1 | 6/2000 |
| DE | 199 04 901 A1 | 8/2000 |
| DE | 199 04 902 A1 | 8/2000 |
| DE | 100 03 896 A1 | 8/2001 |
| DE | 10341907 A1 | 9/2003 |
| EP | 1375979 A2 | 1/2004 |
| EP | 1 626 322 A1 | 2/2006 |
| WO | WO-02/087053 A1 | 10/2002 |

* cited by examiner

METHOD AND DEVICE FOR TRIGGERING A CIRCUIT ARRANGEMENT WITH ELECTRIC ACTUATORS

This application is a national stage completion of PCT/EP2007/051677 filed Feb. 21, 2007, which claims priority from German Application Serial No. 10 2006 011 805.7 filed Mar. 15, 2006.

FIELD OF THE INVENTION

The invention concerns a process and a device for actuating a shifting arrangement with electric actuators.

BACKGROUND OF THE INVENTION

Electrically operable actuators, for example valves, are used in motor vehicles, in particular, for control functions in hydraulic circuits. There are basically two different types of designs. In the commonly utilized pilot operated valves, a magnet in a pilot operated system acts on a relief bore, which equalizes the pressure difference between the pressurized sides of a sealing element, wherein the sealing element on the valve seat is activated by the pressure medium itself. Magnetic valves of this kind have the advantage that they can control large flow volumes at high pressures with relatively low force and accordingly low current consumption. However, since they work according to the differential pressure principle, they require a constant specific minimum operating pressure.

Directly controlled valves do not require a minimum operating or differential pressure for their switching function so their operating range starts at zero bar and reaches a specific maximum operating pressure. This type of valve can have a particularly compact configuration, is suitable for practically any kind of installation position and is comparatively cost effective. In magnetic valves of this kind, the magnetic force is utilized directly to open or close the valve seat. The valve seat is generally closed by way of a spring force and the static pressure of the medium when it is disconnected. If the magnet or the magnetic coil is supplied with electric voltage, an armature is lifted against these forces from the valve seat and the valve is opened. Here the maximum operating pressure and the volume flow depend directly on the magnetic force. For this reason directly controlled valves consume, as a rule, more current than pilot operated valves. This can have as a consequence an unallowably high current load during operation in electric circuits with limited current supply.

From DE 199 04 902 A1 is known a proportional pressure control valve for actuating a clutch in an automatic motor vehicle transmission, which is configured as a directly controlled valve. The directly controlled valve has a proportional magnet, which is connected via an armature rod to a piston. The piston is pressed by a spring force into an initial position against a valve seat, whereby the valve is closed. The magnetic armature, and with it the armature rod with the piston, is moved against the spring force by a suitable current supply to the coil of the magnet, whereby the piston lifts from the valve seat and an inlet opening for the medium (hydraulic oil) is opened. When the inlet is fully open, the magnetic armature is seated on a spacer disk in a holding position and is held in this position via a corresponding current feed. This holding function can be adjusted via the coil current with allowance for the hydraulic pressure that acts against the piston, and can be used to control the pressure on a clutch cylinder.

Further, from DE 100 03 896 A1 a process is known for actuating proportional magnets in directly controlled valve design in the manner described in DE 199 04 902 A1, or in a pilot operated valve design, as can be seen in DE 199 04 901 A1, in which a holding position is realized. Means that detect the movements of the armature based on induced voltages with feedback effects on the coil current are provided therein. These feedback effects are in direct connection with the holding function and can be utilized to guide a controlled transition between a holding range (pressure range within the holding position) and a control range (pressure range outside of the holding position) of the valve.

Finally, a control arrangement is known from DE 195 36 697 A1 which controls the actuating current of a proportional directional valve in a hydraulic control section. The control arrangement is based on non-linearities in the hydraulic section, which cannot be sufficiently detected with conventional state monitors, and utilizes digitally detected sensor values from which estimated signals can be determined by an iteration process in a number of integration steps, which are then made available to the control arrangement for further processing. The process is also suitable for systems with pilot operated valves as well as for systems with directly controlled valves. In directly controlled valves a measured variable derived from the measured coil current can be used as an input variable for the control circuit.

A disadvantage of the known processes and devices for actuating proportional magnets is that, even though they control the actuation of individual proportional magnets, the proportional magnets are only viewed in isolation. The effects, which the relatively high current demand especially of directly controlled valves, can have in the shifting arrangement with a multitude of different consumers are for the most part not taken into consideration. This can impair the reliability of the affected system in a shifting arrangement with a limited total available current, as is common in motor vehicle electric circuits.

Considering this background, it is an object of the invention to disclose a method and a device for actuating a shifting arrangement, which reliably prevent a preset allowed current load, with a comparatively high current requirement of electric actuators or consumers, for example, directly controlled valves, from being exceeded.

SUMMARY OF THE INVENTION

The invention is based on the realization that exceeding an allowed current load in the shifting arrangement can be prevented with the aid of a monitoring function, which processes the shift requests after a test or sequentially.

The invention is accordingly based on a process for actuating a shifting arrangement with electric actuators with directly controlled valves of an electrohydraulic, electropneumatic, electromagnetic or electromotor transmission control of a motor vehicle. In order to attain the object, the invention provides that a current monitoring function for limiting a current load in the shifting arrangement is present which comprises at least the following steps:
a) determination of the total current of the shifting arrangement available at a point in time,
b) detection of shift requests from shift elements,
c) comparison of the current requirement of the shift requests with the available total current,
d) testing of the shift requests according to preset priorities, and
e) sequential shifting of the shift elements according to the priority test when the shift requests would exceed the total available current; and f) immediate shifting of the shift elements when the shift requests would not exceed the total available current.

The current monitoring function, according to the invention, makes it advantageously possible to use directly controlled valves with an increased current requirement in an electrohydraulic transmission control and ensures at the same time that a maximum current load of the transmission control is maintained. This is achieved by detecting the shift requests and subjecting these to a priority test. If there is danger of exceeding a previously determined total available current, positively tested shift requests are executed based on their priority. Conversely, negatively tested shift requests are initially blocked until their processing is possible and are then executed.

This process can basically be used arbitrarily on any corresponding circuits, wherein the respective current limits can be freely applied. This produces very flexible application possibilities. Direct control magnetic valves can be used in this way as actuators, in particular in motor vehicles, in order to convert the signals processed in a transmission control device to initiate a gear change into an actuation of the corresponding shift valves to operate at least one clutch.

Here it is advantageous to prioritize the requested valve feeds depending on their respective function as a shift element, possibly in an active shift phase, and on the type of shift request, wherein with respect to the type of shift request, a distinction can be made at least between the functions of engagement, change, and confirmation, since different current loads occur therein. The result is that preferential safety-relevant valve operations are always carried out immediately and, at the same time, an effective sequence of shifting procedures is ensured.

It can additionally be provided that the total available current is determined based on a total effective current, preset limit currents, and predetermined reserved currents for shift elements that are still to be engaged, wherein it can be provided in addition that the effective total current is determined based on a permanent current load of the shifting arrangement and an effective current requirement of the active shift elements, and that a distinction is made, with regard to the limit currents, between long-term current loads and short-term current loads.

By taking into consideration permanent, instantaneous and expected current loads, an effective limit value for the actual total current available under the respective operating conditions is obtained, which allows effective utilization of the current potential so that deferred shifting procedures are only delayed for as long as is absolutely necessary.

In order to determine the effective current requirement of the active shift elements as well as the limit currents for long-term and/or short-term current loads, it is advantageous to make use of the characteristics of the respective electric fuses, which are generally present in any case. These data are retrievable at any time as benchmark data to determine the total available current.

An even more accurate determination of the total available current can be achieved in that, as can also be provided, the current requirement of the active shift elements and/or the limit currents for long-term and/or short-term current is obtained using a learning algorithm, which can be or is derived from previous actuations.

It is also possible to determine a maximum allowed long-term current and a short-term maximum available current from the determined total available current. Because it is usually harmless to allow short-term overloads at the corresponding fuses of electric consumers, it is advantageous not to block short-term shifting procedures that exceed the permanent current load. It is practical for this purpose to take into consideration an expected duration of a respective actuation when the shifting requests are tested.

It is another object of the invention to create a device for actuating a shifting arrangement, which reliably prevents the preset allowed current load from being exceeded when there is a comparatively high current requirement of the electric actuators or consumers, for example, directly controlled valves.

Further, the invention is therefore based on a device for actuating a shifting arrangement with electric actuators, for example, having directly controlled valves of an electrohydraulic, electropneumatic, electromagnetic, or electromotor transmission control of a motor vehicle. The invention also attains the object by providing control and detection means, such that a current monitoring function can be generated in order to limit the current flow in the shifting arrangement.

It can also be provided that the control and detection means feature at least one processor unit, in which instantaneous, permanent and expected electric current flows can be detected and further processed in a time-resolved manner, in which shift requests can be detected and can be further processed in a priority test in a time-resolved manner, in which the processed current flows can be compared with the processed shift requests and through which output signals for initiating current-limiting measures in the shifting arrangement can be generated based on the processed current flows.

With this arrangement, it can be advantageously achieved that consumers with high current consumption, for example directly controlled valves, can be utilized in transmission controls, wherein the danger of exceeding a preset maximum current load is simultaneously prevented.

BRIEF DESCRIPTION OF THE DRAWINGS

The invention will now be described, by way of example, with reference to the accompanying drawings in which.

DETAILED DESCRIPTION OF THE INVENTION

Figure 1:
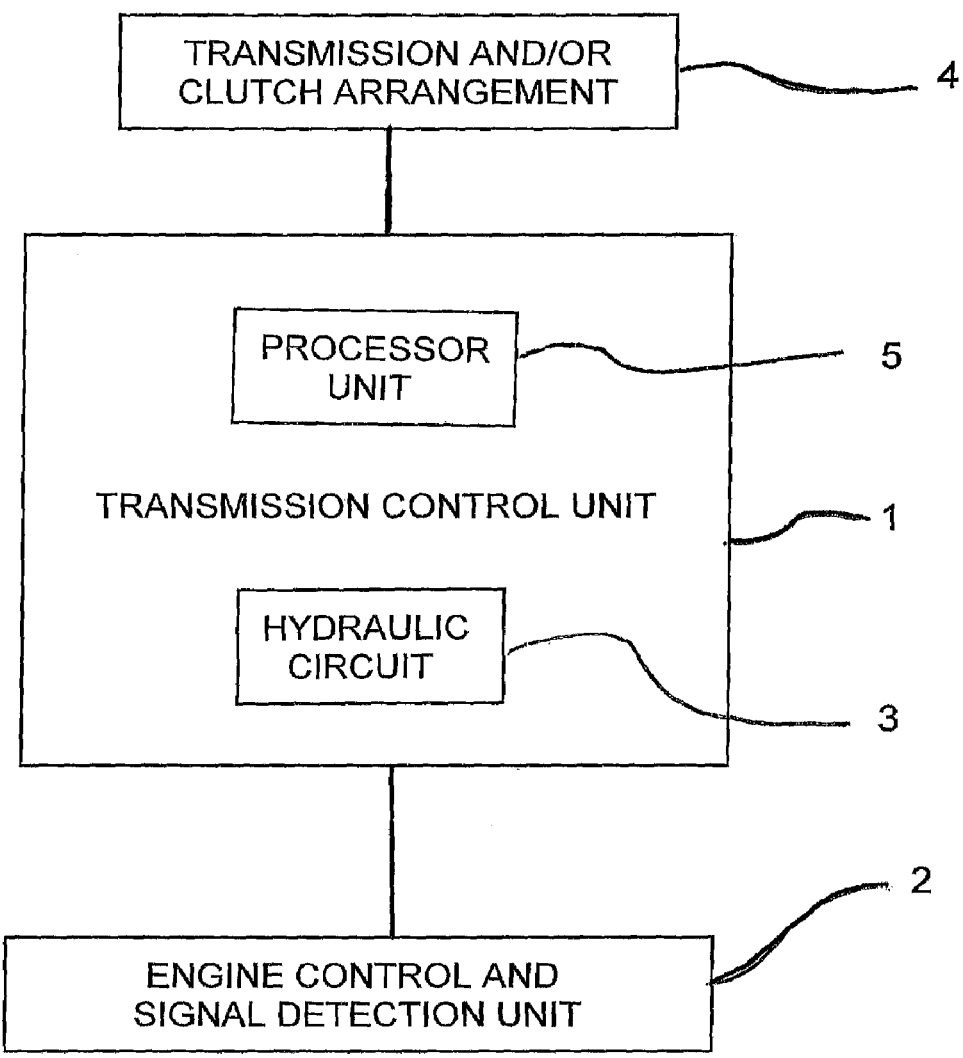
FIG. 1 shows a block diagram of an electronic transmission control.

A simplified block diagram of an electronic transmission control of a motor vehicle is accordingly shown in FIG. 1. A central transmission control unit 1 with a connected hydraulic circuit 5 with directional control electromagnetic valves (not shown) is provided therein. The transmission control unit 1 communicates with an engine control and a signal detection unit 2, over which data concerning a driver request and/or a driving situation can be detected.

The transmission control unit 1 also has a processor unit 3 in which electric current and voltage data can be detected and processed in a time-resolved manner by way of suitable software, whereby a current monitoring function is made available. Via output data of the transmission control unit 1, the shift elements of the hydraulic circuit 5 can be actuated which, in turn, control a transmission and/or clutch arrangement 4.

In an electronic transmission control, a driver request is converted into signals, for example, for gear selection, converter lockup or clutch operation, by way of a gear selector I position, a driving program switch, a kickdown switch and/or throttle flap position in the transmission control unit 1. The associated control valves in the hydraulic circuit 5, which operate the corresponding shift valves, are actuated for this reason.

Figure 2:
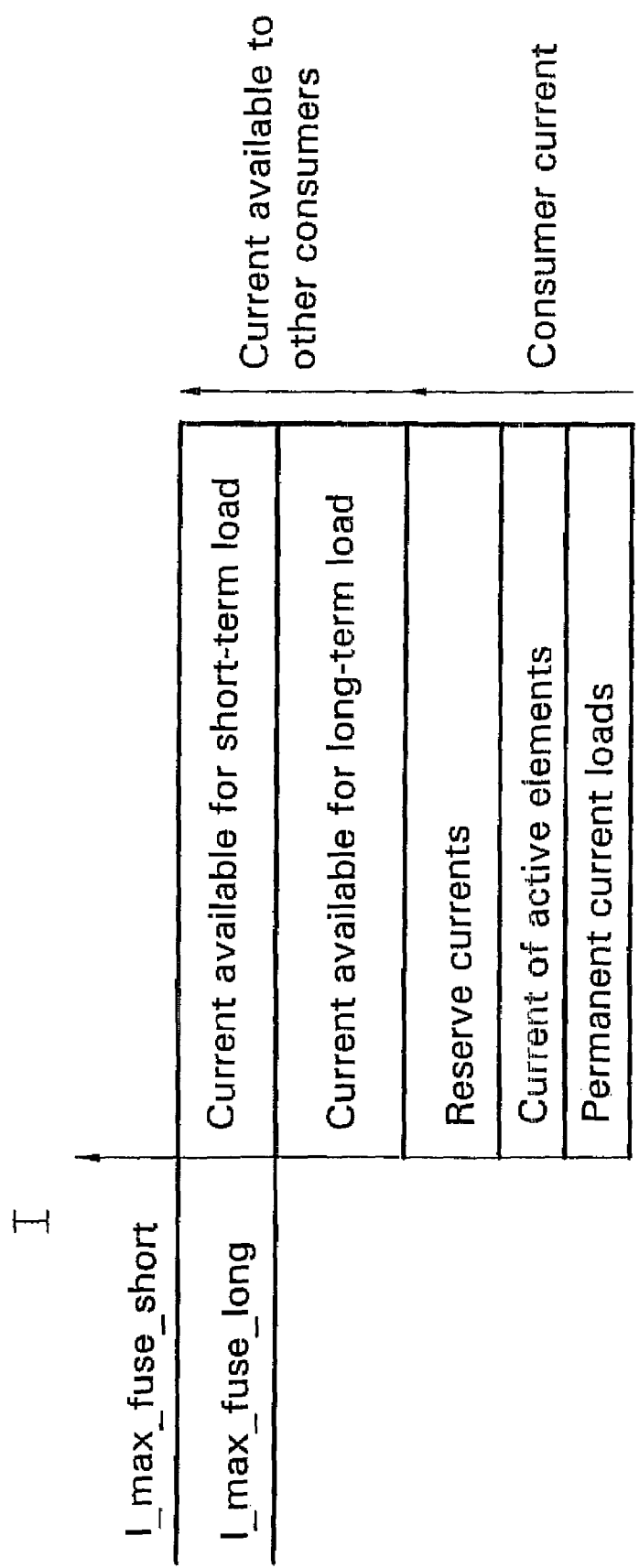
FIG. 2 shows a current diagram for a current monitoring function.

Below a process for actuating a shifting arrangement with directly controlled valves of a motor vehicle electrohydraulic transmission control, such as this will be explained with reference to the current diagram shown in FIG. 2, in which the individual current components are represented.

Here "permanent current loads," for example, the permanent supply of an electronic control unit, are detected first and the instantaneous "current of active elements" is determined based on their fuse. From this, a total effective current is obtained. "Reserved currents" for the elements to be subsequently shifted are added to it during further processing. A fixed "consumer current" is calculated therefrom.

Subsequently the limits currents I_max_fuse_short for short-term and I_max_fuse_long for long-term loads on the corresponding fuses are determined on the basis of the fuse specifications and the previous actuation. The differences between the "consumer current" and the limit currents make the "current available for further consumers" for short-term or long-term loads. From the limit currents and the total effective current, as well as the reserved currents, the total available current of the system for short-term or long-term loads is obtained.

Based on this determined total available current, all shift requests present at a point in time are tested regarding the available electric currents, the duration of actuation to be expected and preset priorities. The requested valve feeds are classified, according to the type and function of the respective shift element in the hydraulic circuit, according to the instantaneous shift phase and according to the types of shift requests, for example, gear change, possibly with counter-pulse, engagement, or confirmation.

Subsequently, the valve feeds determined to have priority are immediately connected and other possible current feeds are not connected until it is possible, that is, only when the maximum available current is not exceeded thereby.

If the test shows that the total available current is sufficient for all currently available shift requests, all of the shift requests can, of course, be processed without time limitations.

REFERENCE NUMERALS 1 transmission control unit
2 engine control and/or signal detection unit
3 processor unit
4 transmission and/or clutch arrangement
5 hydraulic circuit

The invention claimed is:

1. An actuation process for a shifting arrangement with directional control valves for one of electrohydraulic, electropneumatic, electromagnetic and electromotor transmission control of a motor vehicle, the method comprising a current-monitoring function, for limiting a current load, in the shifting arrangement, and the current-monitoring function comprises the following steps:
   a) determining a total available current of the shifting arrangement available at a desired point in time,
   b) detecting shift requests from shift elements,
   c) comparing current requirements, requested by the shift requests, with the total available current,
   d) testing the shift requests according to preset priorities,
   e) when the shift requests would cause the total available current to be exceeded, sequentially shifting the shift elements corresponding to the priority test and initially blocking at least one shift request until the method determines that the at least one shift request can be executed without exceeding the total available current, and
   f) when the shift requests would not cause the total available current to be exceeded, immediately shifting the shift elements.

2. The actuation process according to claim 1, further comprising the step of determining the total available current based on a total effective current, preset current limits, and predetermined reserved currents for shift elements that are still to be shifted.

3. The actuation process according to claim 2, further comprising the step of determining the total effective current based on a permanent current load of the shifting arrangement and an effective current requirement of the active shift elements.

4. The actuation process according to claim 2, further comprising the step of drawing a distinction regarding the current limits between long-term current loads and short-term current loads.

5. The actuation process according to claim 1, further comprising the step of determining, based on the determined total available current, a maximum allowed long-term current and a maximum available short-term current.

6. The actuation process according to claim 1, further comprising the step of taking an expected duration of a respective actuation into consideration when the shifting procedure is tested.

7. The actuation process according to claim 1, further comprising the step of assigning a shift request, for current feed to a valve, priority depending on the valve's function as a shift element, an active shift phase, and the type of shift request.

8. The actuation process according to claim 7, further comprising the step of drawing a distinction regarding the type of shift request at least between the functions of engagement, change, and confirmation.

9. The actuation process according to claim 1, further comprising the step of utilizing characteristics of respective electric fuses in order to determine at least one of the current requirement of the active shift elements, current limits for long-term currents loads and current limits for short-term current loads.

10. The actuation process according to claim 1, further comprising the step of determining at least one of the current requirements of the active shift elements, current limits for long-term currents loads and current limits for short-term current loads with aid of a learning algorithm derived from previous actuations.

11. An actuation device for a shifting arrangement with direct-control valves for at least one of an electrohydraulic, electropneumatic, electromagnetic and electromotor transmission control of a motor vehicle,
   wherein the actuating devices comprises control and detection means for monitoring an available and an actual current and for limiting a current flow, in the shifting arrangement, which controls actuation of the control valves without exceeding the total available current of the shifting arrangement;
   the control and detection means has at least one processor unit (3) in which instantaneous, permanent and expected electric current flows can be detected and further processed,
   time-resolved shift requests can be detected and further processed in a priority test, and
   the processed current flows can be compared with the processed shift requests and output signals, for initiating current-limiting measures in the shifting arrangement, are generated based on the processed current flows.

12. An actuation method for a circuit arrangement having directly controlled control valves of an electrohydraulic or electropneumatic transmission controller of a motor vehicle, the method comprising a current monitoring function, for limiting a current load in the circuit arrangement, and the current monitoring function comprising the following steps:
   a) ascertaining a total available current of the circuit arrangement available at a desired time;
   b) detecting switching requests from shifting elements, with a switching request for supplying power to one of the control valves being provided with a priority as a function of the control valve's function as a shifting element and a type of switching request being requested;
   c) comparing the current requirements, requested by the switching requests, with the total available current;
   d) checking the switching requests according to prespecified priorities; and
   e) in an event that current requirements, requested by the switching requests, exceed the total available current, then sequentially shifting the shifting elements in accordance with the prespecified priorities.

13. The actuation method according to claim 12 further comprising the step of ascertaining the total available current from an actual total current, prespecified current limits and predetermined current reserves for the shifting elements which still remain to be switched.

14. The actuation method according to claim 13, further comprising the step of ascertaining the actual total current from a permanent current load on the circuit arrangement and an actual current requirement of active shifting elements.

15. The actuation method according to claim 13, further comprising the step of, in a case of the current limits, drawing a distinction between continuous current loads and brief current loads and, in the event that the shift requests cause the total available current to be exceeded, and initially blocking at least one shift request until the method determines that the at least one shift request can be executed without exceeding the total available current.

16. The actuation method according to claim 12, further comprising the step of determining, from the ascertained total available current, a maximum permissible continuous current and a briefly available maximum current.

17. The actuation method according to claim 12, further comprising the step of, when checking the switching requests, taking into consideration an expected duration of a respective actuation.

18. The actuation method according to claim 12, further comprising the step of providing a switching request for supplying power to a valve as a priority as a function of an active switching phase.

19. The actuation method according to claim 12, further comprising the steps of:
   drawing a distinction with respect to a type of shifting at least between the functions switch on, switch over, and confirm;
   using characteristic data of respective electrical fuses for one of ascertaining the current requirement of the active shifting elements and ascertaining the current limits for one of continuous and brief current loads; and
   ascertaining one of the current requirement of the active shifting elements and the current limits for one of continuous and brief current loads with the aid of a learning algorithm which is derived from previous actuation operations.

* * * * *